Sept. 10, 1940.   A. B. COX   2,214,452
HEATING OF FLUIDS
Filed Nov. 9, 1938
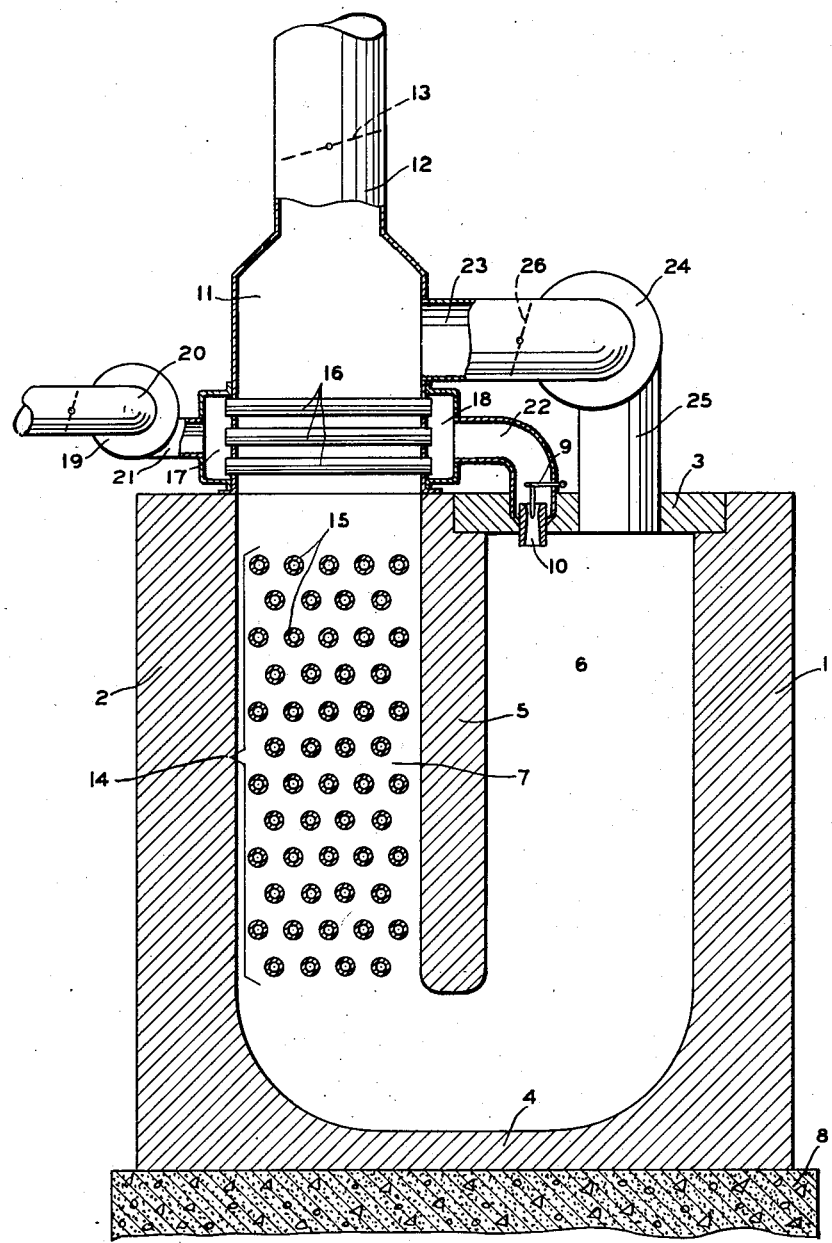
Inventor:
A. Byrl Cox,
By: Lee J. Gary
Attorney.

UNITED STATES PATENT OFFICE 2,214,452

HEATING OF FLUIDS

Albert Byrl Cox, Long Beach, Calif., assignor to Universal Oil Products Company, Chicago, Ill., a corporation of Delaware Application November 9, 1938, Serial No. 239,686

5 Claims. (Cl. 122—356)

The invention relates particularly to an improved form of fluid heater designed to employ relatively mild temperatures about the fluid conduit and substantially uniform temperatures throughout the fluid heating zone. The invention also embodies the improved method of heating which may be conducted in the structure herein provided.

The improved form of heater herein disclosed is of the general type commonly known in the art as a "convection" heater, due to the fact that a predominant portion of the heat supplied to the fluid undergoing treatment is imparted thereto by direct contact between the combustion gases and the fluid conduit. The advantage of this type of heater for certain services is well recognized and when, as in this invention, flue gas recirculation is employed with this type of heater, substantially uniform temperature conditions may be obtained throughout the fluid heating zone and an average rate of heat input to the entire fluid conduit, which closely approaches the maximum rate at any point therein, may be obtained, thus avoiding localized excessive temperatures and rates of heating.

In addition to the benefits which commonly result from the use of "convection" heaters employing flue gas recirculation, the improved form of heater herein provided has several additional advantages not common to conventional heaters of this type. Briefly, some of its most important features and advantages are as follows:

The circuit through which flue gases are recycled is short and direct. This results in efficient flue gas recirculation and obviates extensive and costly duct work.

The heater is down-fired, (i. e., the fuel and air for combustion is directed downwardly into the combustion zone). This, in conjunction with the provision for supplying a relatively large amount of excess air to the combustion zone, materially assists in obtaining relatively short flames which do not carry over into the fluid heating zone and cause localized, excessively high rates of heating therein.

The air for combustion and excess air is preheated to a high temperature, whereby large amounts of excess air may be employed and relatively short flames obtained without excessively reducing the temperature of the combustion gases. The air preheating arrangement is simple and efficient.

Although the heater is down-fired, as above mentioned, the direction of flow of the combustion gases through the fluid heating zone is upward. This combination results in efficient mixing of the gases in both the combustion zone and fluid heating zone, due to the natural tendency for hot gases to rise. In the combustion zone the freshly generated hot combustion gases, which tend to rise, meet the cooler incoming recirculated flue gases in the upper portion of this zone and are efficiently commingled therewith. The efficient mixing in the combustion zone results in a substantially uniform temperature throughout the entire cross-sectional area of the gas stream leaving this zone and entering the fluid heating zone. Since the gases passing through the fluid heating zone are cooled by contact with the fluid conduit, the thus cooled gases will tend to fall and meet the oncoming hotter gases in this zone. This results in turbulence, good mixing and high gas velocity due to the turbulence in the fluid heating zone, all of which is beneficial to efficient and substantially uniform heating.

The combination of down-firing in the combustion zone and up-draft in the fluid heating zone permits the use of a simple furnace setting with no underground ducts and simple foundations. It also economizes on the ground area required.

A novel and efficient arrangement of the flue, air preheater and flue gas recirculating equipment is provided. Preferably, the air preheater is located within the flue ahead of the point from which flue gases are withdrawn for recirculation. This not only provides high-temperature air for combustion, but also decreases the temperature of the flue gas supplied to the recirculating fan or blower, thus reducing its required size as compared with conventional practice and reducing the severity of conditions under which it must operate.

It will be apparent from the above that many of the features are closely related and interdependent. Therefore, although some of the features mentioned are not new, per se., invention is believed to reside in their novel and advantageous combination, as herein provided.

The accompanying diagrammatic drawing illustrates one specific form of heater which the invention provides. This drawing represents an elevation of the heater looking toward the end of the combustion and fluid heating zones and is shown principally in cross section.

Referring to the drawing, the main furnace structure comprises side-walls 1 and 2, a roof 3, a floor 4 and a centrally disposed wall 5 extending from the roof to a point somewhat above the floor and also extending between the end walls of the heater which do not appear in this particular view. Wall 5 divides the interior of the heater into a combustion zone 6 and a fluid heating zone 7.

In the particular case here illustrated, the furnace setting rests upon a slab foundation 8, although any other conventional form of simple foundation structure may be employed. Floor 4 may be at or slightly above the grade line or, when desired, floor 4 and the lower portion of the side walls may extend below grade, in order to bring the fluid conduit close to the ground for easy cleaning of the tubes without platforms or the like, particularly when the furnace is of relatively small capacity and size.

Burner 9, which may be of any desired form, supplies combustible fuel downwardly to combustion zone 6 through firing port 10 located in the roof of the furnace. Air for combustion and excess air is supplied, as will be later described, through the same firing port. Preferably, a plurality of burners and firing ports are provided at spaced intervals along the length of the furnace roof, although only a single burner and firing port appear in this particular view.

The hot combustion gases generated in zone 6 commingle therein with the recirculated flue gases supplied to this zone through the roof of the furnace, as will be later described, and the commingled gases pass downwardly through this zone beneath wall 6 and thence upwardly through fluid heating zone 7 to flue 11 wherefrom a regulated portion of the gases are directed through stack 12, controlled by damper 13, to the atmosphere.

A fluid conduit 14 which, in the particular case here illustrated, comprises a plurality of superimposed horizontal rows of horizontally disposed tubes 15 is provided within fluid heating zone 7 and receives heat from the combustion gases passing through this zone by direct contact therewith. Preferably, as in the case here illustrated, tubes 15 of each horizontal row of the fluid conduit are staggered in relation to the tubes of the next adjacent row although, when desired, the tubes may be aligned both vertically and horizontally. Any desired arrangement of flow may be provided through the fluid conduit for the fluid undergoing treatment but, in most cases, since substantially uniform temperatures are preferably employed through the fluid heating zone, adjacent tubes in each row and adjacent rows of tubes will be connected at their ends, in series, by means of suitable return bends which are disposed outside the heating zone and do not appear in this view of the apparatus. This arrangement is well known and does not require illustration. It is advantageous in furnaces of this type in that it results in high linear velocity for the fluid passing through the tube bank, as compared with a parallel flow arrangement, thereby increasing the heat transfer rate obtained for a given mean temperature difference between the heat-transmitting and the heat-absorbing materials.

The combustion gases leaving the fluid heating zone contact the tubular elements 16 of the air preheater which are disposed across flue 11 directly above the fluid heating zone and are connected for the passage of air therethrough in parallel by means of inlet header 17 and discharge header 18 which, as in the case here illustrated, may be simple flanged boxes bolted or otherwise attached to the walls of the flue. In the particular case here illustrated the metal side walls of the flue serve as tube sheets for the air preheating tubes, although this is not an essential or limiting feature of the invention.

A blower 19, communicating through inlet duct 20 with the atmosphere and through outlet duct 21 with header 17, supplies air for combustion and excess air through the preheater tubes to discharge header 18 and thence through duct 22 and firing port 10 to the combustion zone. This blower may be of any desired form and may be driven by any well known means not illustrated in the drawing.

A duct 23, communicating at its inlet end with flue 11 at a point above the air preheater, delivers relatively cool combustion gases, which have passed over the tubes of fluid conduit 14 and over the air preheater tubes, to the gas recirculating fan or blower 24 wherefrom they are returned through duct 25 to the upper portion of combustion zone 6 to commingle therein with the freshly generated, hot combustion gases and reduce the temperature of the latter prior to their contact with the tubes of bank 14. Due to the location of the air preheater with reference to the flue gas recirculating equipment and consequent relatively low temperature of the combustion gases being recirculated, a simple and inexpensive flue gas fan or blower of any conventional form may be employed. It may be driven by an electric motor, turbine or any other desired motivating means, not illustrated. The adjustment of damper 26 in duct 23 and damper 13 in stack 12 regulates the quantity of flue gases recirculated in relation to the quantity discharged from the heater through stack 12.

The improved form of furnace herein provided is particularly well adapted to use in certain oil refining operations including topping, low pressure distilling and mild cracking operations. It is also particularly advantageous as applied to relatively low temperature catalytic processes for the treatment of hydrocarbon oils and/or gases such as, for example, catalytic hydrogenation, dehydrogenation and polymerization processes. It is not so limited, however, and may be advantageously employed for relatively mild and efficient heating of any fluid in either liquid, gaseous or mixed phase.

I claim as my invention:

1. A heater for fluids which comprises, in combination, a furnace structure having side walls, end walls, a roof and a floor, an interior wall extending between the end walls and from the roof to a point above and adjacent the floor which divides the interior of the furnace into a combustion zone and a fluid heating zone, means comprising burner ports disposed within the roof of the furnace and burners for supplying combustile fuel and air downwardly into the combustion zone, means for passing combustion gases from the combustion zone upwardly through the fluid heating zone, a fluid conduit disposed within the fluid heating zone, a flue disposed above the fluid heating zone, conduits for preheating air disposed within said flue, means for delivering air to said conduits, means for supplying preheated air from said air-preheater conduits through said burner ports to the combustion zone, a stack communicating with said flue at a point therein beyond the air pre-heater conduits, means for removing combustion gases from said flue at a point between the air-preheater conduits and the stack, and means for returning the last named combustion gases to the upper portion of the combustion zone.

2. A heater for fluids which comprises, in combination, a furnace structure having a combustion zone and a fluid heating zone in open communication at their lower ends, a fluid conduit disposed within the fluid heating zone, means for supplying combustile fuel and air to the upper portion of the combustion zone, a flue mounted above the fluid conduit and communicating with the upper portion of the fluid heating zone, a stack communicating with said flue, a preheater for said air in said flue, means for removing combustion gases from the flue between the preheater and the stack, and means for supplying the same to the upper portion of the combustion zone.

3. A heating apparatus comprising a furnace structure having a combustion zone and a heating zone, heating tubes in the last-named zone, burner means for the combustion zone, means for passing combustion gases from the combustion zone through the heating zone, an air preheater disposed in the path of the combustion gases discharging from the heating zone, means for returning to the combustion zone combustion gases which have passed over said preheater, and means for supplying preheated air from the preheater to said burner means.

4. A heating apparatus comprising a furnace structure having a combustion zone and a heating zone, heating tubes in the last-named zone, burner means for the combustion zone, means for passing combustion gases from the combustion zone through the heating zone, a stack, a combustion gas discharge flue connecting the heating zone with the stack, an air preheater in said flue and means for supplying preheated air therefrom to the burner means, and means for returning combustion gases from a point in said flue between the preheater and stack to the combustion zone.

5. A heating apparatus comprising a furnace structure having a combustion zone and a heating zone, heating tubes in the last-named zone, burner means for the combustion zone, means for passing combustion gases from the combustion zone through the heating zone, a combustion gas discharge passageway communicating with the heating zone, an air preheater in said passageway and means for supplying preheated air therefrom to the burner means and means for returning combustion gases from a point in said passageway beyond the preheater to the combustion zone.

A. BYRL COX.